(12) United States Patent
Seki et al.

(10) Patent No.: US 7,490,689 B2
(45) Date of Patent: Feb. 17, 2009

(54) VEHICLE BODY FRAME STRUCTURE

(75) Inventors: Yoshitaka Seki, Saitama (JP); Jun Hariu, Saitama (JP); Hiroshi Nakagome, Saitama (JP); Toshihisa Nagashii, Saitama (JP); Hitoshi Akaoka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 499 days.

(21) Appl. No.: 11/391,209

(22) Filed: Mar. 29, 2006

(65) Prior Publication Data

US 2006/0219463 A1 Oct. 5, 2006

(30) Foreign Application Priority Data

Mar. 31, 2005 (JP) ............................. 2005-102497

(51) Int. Cl.
*B62K 11/02* (2006.01)
*B62K 19/28* (2006.01)

(52) U.S. Cl. ..................................... 180/229; 280/281.1

(58) Field of Classification Search ................. 180/219, 180/229; 280/274, 281.1
See application file for complete search history.

(56) References Cited

U.S. PATENT DOCUMENTS

| 4,684,144 | A | * | 8/1987 | Tanaka ..................... 280/281.1 |
| 4,696,363 | A | * | 9/1987 | Enda .......................... 180/219 |
| 5,012,883 | A | | 5/1991 | Hiramatsu |
| 5,211,255 | A | * | 5/1993 | Fukuda ........................ 180/219 |
| 7,073,617 | B2 | * | 7/2006 | Miyashiro et al. ........... 180/219 |
| 7,188,695 | B2 | * | 3/2007 | Miyakawa et al. .......... 180/219 |
| 7,331,322 | B2 | * | 2/2008 | Seki et al. .............. 123/184.21 |
| 2004/0124031 | A1 | * | 7/2004 | Tanabe et al. ............... 180/309 |
| 2005/0051375 | A1 | * | 3/2005 | Momosaki .................. 180/219 |

FOREIGN PATENT DOCUMENTS

| EP | 0 388 820 A1 | | 9/1990 |
| EP | 0 403 177 A2 | | 12/1990 |
| JP | 61 125977 A | | 6/1986 |
| JP | 02256580 A | * | 10/1990 |
| JP | 03253483 A | * | 11/1991 |
| JP | 03295782 A | * | 12/1991 |
| JP | 2004-114719 A | | 4/2004 |
| JP | 2006046301 A | * | 2/2006 |
| JP | 2007062618 A | * | 3/2007 |

* cited by examiner

*Primary Examiner*—Paul N Dickson
*Assistant Examiner*—Daniel Yeagley
(74) *Attorney, Agent, or Firm*—Birch, Stewart, Kolasch & Birch, LLP

(57) ABSTRACT

To easily secure a welding length when an opening is formed at a portion in the vicinity of a joint portion between a head pipe portion and a main frame portion. A front opening penetrating through a vehicle body frame across a head pipe portion and a main frame portion. A rib extending across the front opening along a front parting plane of the vehicle body frame. The rib being divided along the front parting plane and the edge portions of the divided rib portions opposing the outer periphery of the main frame portion are integrally joined.

20 Claims, 4 Drawing Sheets

VEHICLE BODY FRAME STRUCTURE

CROSS-REFERENCE TO RELATED APPLICATIONS

The present application claims priority under 35 USC 119 to Japanese Patent Application No. 2005-102497 filed on Mar. 31, 2005 the entire contents of which are hereby incorporated by reference.

FIELD OF THE INVENTION

The present invention relates to a vehicle body frame structure in a vehicle such as a motorcycle.

DESCRIPTION OF BACKGROUND ART

A vehicle body frame is known that is divided into a front frame portion including a head pipe portion and a main frame portion, and a rear frame portion including a pivot plate portion. The frame portions are formed integrally by a hollow casting, whereby the number of welding points are reduced thereby reducing a manufacturing cost. See, for example, JP-A-2004-114719.

In the structure known in the related art, the parts manufactured by the hollow casting are relatively large. Thus, it is preferable to divide the front frame portion into the head pipe portion and the main frame portion.

In this case, it is necessary to secure a sufficient welding length for increasing a joint strength between the head pipe portion and the main frame portion. In the case wherein an opening is formed in the vicinity of the joint portion, a structure is desirable wherein the welding length can be secured without applying welding on the inner side of the opening.

SUMMARY AND OBJECTS OF THE INVENTION

According to an embodiment of the present invention, a vehicle frame structure is provided in which the welding length can be easily secured easily when the opening is formed in the vicinity of the joint portion between the head pipe portion and the main frame portion.

As a means for solving the above-described problems, according to an embodiment of the present invention, a vehicle body frame structure 5 includes a head pipe portion 6A and a main frame portion 7A. The head pipe portion and the main frame portion are formed separately and are jointed integrally with each other. An opening 56 penetrates through the vehicle body frame across the head pipe portion and the main frame portion with a rib extending across the opening along a parting plane Z of the vehicle body frame. The rib is divided along the parting plane and the edges of the divided rib portions opposing the outer periphery of the main frame portion are integrally joined.

In this arrangement, the main frame portion and the head pipe portion are joined (welded) also at the edges of the rib portions, which extend across the opening, opposing the outer periphery of the main frame portion. Thus, the joint portion (welded portion) of the vehicle body frame is not divided by the opening. In addition, it is not necessary to apply welding on the inner side of the opening. Therefore, the joint strength of the vehicle body frame can be enhanced while easily securing a welding length.

According to an embodiment of the present invention, the vehicle body frame is a twin tube frame having a pair of left and right main frame portions. This arrangement is preferable for increasing the rigidity of the frame.

According to an embodiment of the present invention, the head pipe portion and the main frame portion are formed of aluminum cast parts. The vehicle body frame which is generally formed into a hollow structure is divided into relatively small parts (the head pipe portion and the main frame portion). Therefore, the hollow cast can easily be performed. Thus, the manufacturing cost can be reduced.

According to an embodiment of the present invention, the opening is used as the engine air-inlet route. Thus, in addition to reducing the weight and optimizing the rigidity of the vehicle body frame, an additional function is provided to the opening. Thus, a rationalization of frame design is achieved.

According to an embodiment of the present invention, the joint strength of the vehicle body frame can be enhanced while easily securing the welding length.

According to an embodiment of the present invention, the frame rigidity can be effectively enhanced.

According to an embodiment of the present invention, the hollow cast can easily be performed. Thus, the manufacturing cost can be reduced.

According to an embodiment of the present invention, rationalization of the frame design can be achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
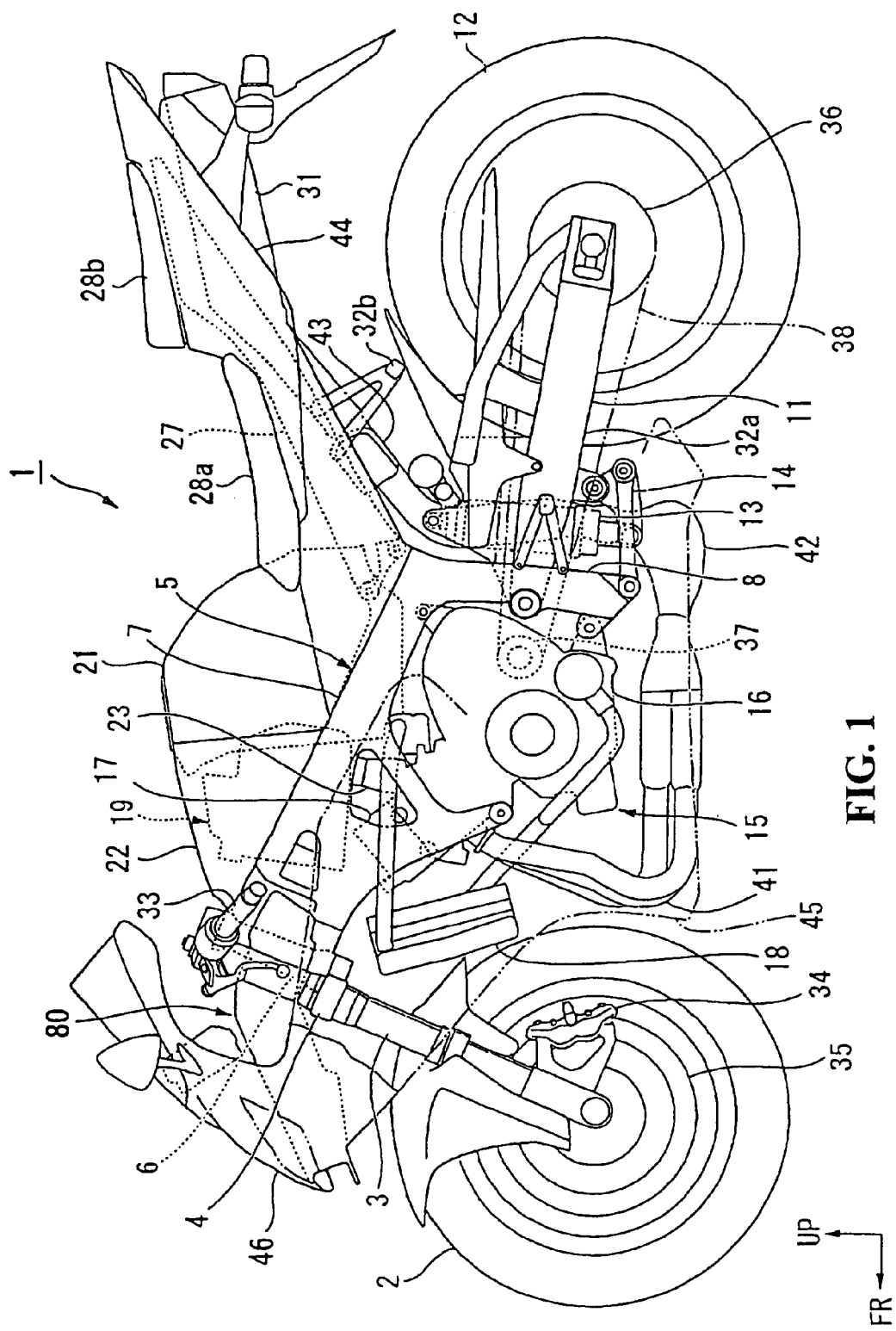
FIG. 1 is a side view of a motorcycle according to an embodiment of the invention.

Referring now to the drawings, an embodiment of the invention will be described. The directions "front", "rear", "left", "right" and so on in the following description correspond to the directions with respect to the vehicle, unless otherwise specified. In the drawings, an arrow FR indicates the forward direction of the vehicle, an arrow LH indicates the leftward direction of the vehicle, and an arrow UP indicates the upward direction of the vehicle, respectively.

As shown in FIG. 1, a pair of left and right front forks 3 for supporting a shaft of a front wheel 2 of a motorcycle 1 are pivotably supported by a head pipe 6 of a vehicle body frame 5 via a steering stem 4 so as to be capable of being steered. Left and right main frames 7 extend obliquely rearwardly and downwardly from the head pipe 6, and rear end portions of the respective main frames 7 continue to upper portions of left and right pivot plates 8, respectively.

While front end portions of swing arms 11 are pivotably supported by the respective pivot plates 8, a shaft of a rear wheel 12 is supported by rear end portions of the swing arms 11. Rear shock absorbers 13 are disposed in the vicinity of the front end portions of the swing arms 11. Each rear shock absorber 13 is connected at one end to the swing arm 11 and at the other end to a portion of the pivot plate 8 lower than a pivot shaft via a link mechanism 14, respectively.

A water-cooled parallel four-cylinder engine 15, which is a prime mover of the motorcycle 1, is arranged downwardly of the vehicle body frame 5. The engine 15 has a structure including a crankcase 16 that forms the lower portion thereof and a cylinder portion 17 extending obliquely upwardly and forwardly thereon. A radiator 18 is provided for cooling the engine 15. The radiator 18 is disposed forwardly of the cylinder portion 17. An air cleaner box 19 is disposed upwardly of the cylinder portion 17 with a fuel tank 21 being disposed rearwardly of the air cleaner box 19. The upper portion of the air cleaner box 19 is covered by an outer cover 22 that is arranged to be flush with the fuel tank 21.

Figure 2:
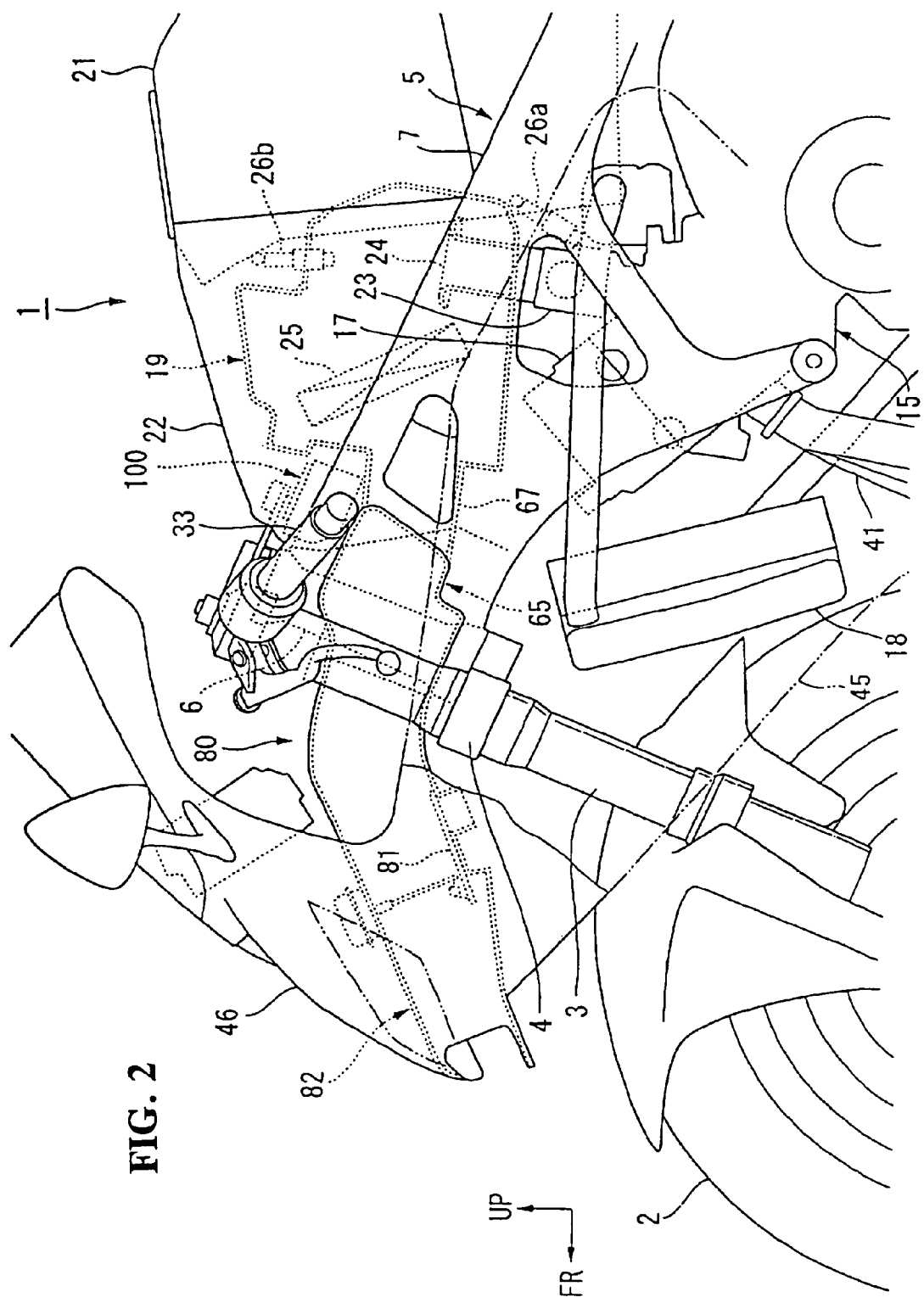
FIG. 2 is an enlarged drawing of a principal portion in FIG. 1.

Referring also to FIG. 2, upstream sides of a train of four throttle bodies 23 corresponding to respective cylinders are connected to a lower wall portion of the air cleaner box 19. Downstream sides of the respective throttle bodies 23 are connected to air-inlet ports on a rear portion of the cylinder portion 17. Funnels 24 continuing to the respective throttle bodies 23 are arranged in the air cleaner box 19.

An air-inlet duct 80, penetrating through the proximity of the head pipe 6 of the vehicle body frame 5 and opening at a front end of a front cowl 46, is connected to a front portion of the air cleaner box 19. An outside flow of air can be introduced into the air cleaner box 19 via the air-inlet duct 80, so that so-called ram-pressure supercharging in which the pressure of the flow of air is utilized as a supercharging pressure when traveling at a high-speed can be achieved. An air-intake valve 81 for changing the air-intake route is provided in the air-intake duct 80.

Outside air introduced into the air cleaner box 19 is filtered through an air cleaner element 25, then is introduced into the respective funnels 24, and then is supplied to the engine 15 together with fuel injected from first injectors 26*a* provided in the respective throttle bodies 23. Second injectors 26*b* corresponding to the respective cylinders are provided on an upper wall portion of the air cleaner box 19 for injecting fuel toward the respective funnels 24, for example, when the engine is rotated at a high-speed.

Front end portions of a seat frame 27, extending obliquely upwardly and rearwardly, are connected to the upper rear sides of the main frames 7. The seat frame 27 supports a seat 28*a* for a rider located rearwardly of the fuel tank 21 with a pillion seat 28*b* for a fellow passenger located behind the seat 28*a*. A muffler is disposed below the pillion seat 28*b*. Steps 32*a* for the rider are mounted to the rear portions of the respective pivot plates 8 with steps 32*b* for the fellow passenger being mounted below the seat frame 27 on both sides thereof.

Left and right handles 33 for steering the front wheel are mounted to upper end portions of the respective front forks 3 with brake calipers 34 being mounted to lower end portions of the respective front forks 3. Brake disks 35 corresponding to the respective brake calipers 34 are mounted to both sides of a hub portion of the front wheel 2, for configuring a front disk brake of the motorcycle 1. A steering damper 100 for applying a damping force to the front steering system is disposed rearwardly of the head pipe 6.

A rear sprocket 36 is mounted to the left side of a hub portion of the rear wheel 12 with a drive chain 38 being wound around the rear sprocket 36 and a drive sprocket 37 on the left side of a rear portion of the engine 15 for achieving a transmission of power between the engine 15 and the rear wheel 12. A rear disk brake of a similar structure as the front disk brake is provided on the right side of the rear wheel 12.

Exhaust pipes 41, corresponding to the respective cylinders, are connected to exhaust ports at a front portion of the cylinder portion 17. The exhaust pipes 41 are joined into one while passing through the front and below the engine 15, and then extend upwardly on the right side of a front portion of the swing arm 11 to a position in the vicinity of the seat frame 27 and are connected to the silencer 31. An exhaust catalyst 42 is provided for purifying exhaust air together with an exhaust device 43 for varying a flowing surface area in the exhaust pipe 41.

A rear cowl 44 for covering the periphery of the seat frame 27 is attached to the rear portion of the vehicle body with center cowls 45 for covering the periphery of the engine 15 being mounted to both sides of the center of the vehicle body. The front cowl 46 for covering the periphery of the head pipe 6 is mounted to the front portion of the vehicle body. An in-cowl duct 82 for defining an air-inlet route of the air-inlet duct 80 from a front end of the vehicle body frame 5 to a front end of the front cowl 46 is disposed on the inside of the front cowl 46.

Figure 3:
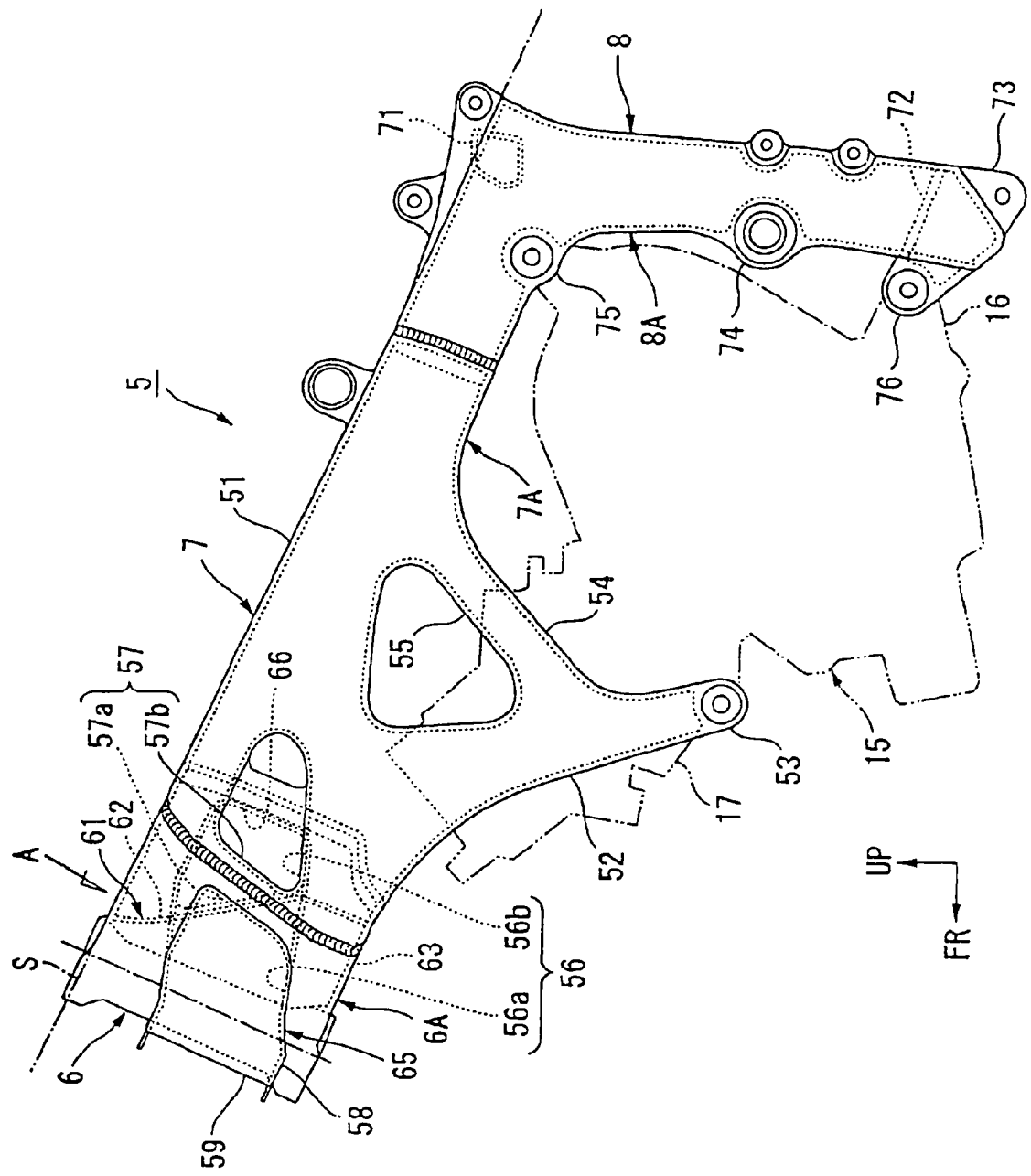
FIG. 3 is a side view of a vehicle body frame of the motorcycle.
Figure 4:
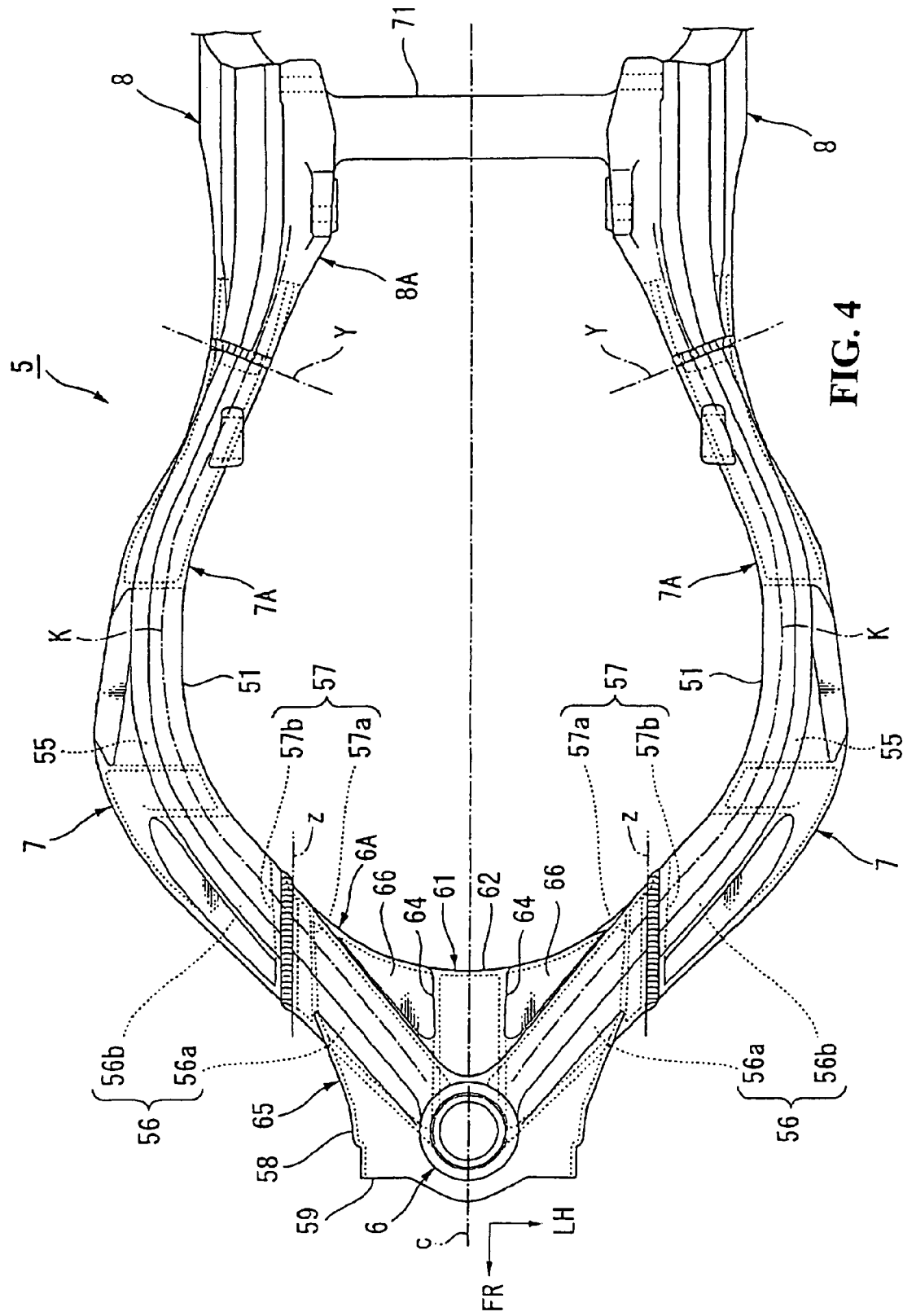
FIG. 4 is a drawing viewed in the direction of an arrow A in FIG. 3.

As shown in FIGS. 3 and 4, the vehicle body frame 5 is a so-called twin tube frame in which the respective main frames 7 linearly connect the head pipe 6 and the respective pivot plates 8. The vehicle body frame 5 has a structure of a so-called diamond-type frame, which utilizes the engine 15 supported by itself as a reinforcing member. The vehicle body frame 5 of this type is formed by integrally joining a plurality of cast parts formed of aluminum alloy as a row material by welding. The seat frame 27 includes cast parts formed of an aluminum alloy as a row material and is divided into left and right halves with the front end portions thereof being integrally secured to a rear end portion of the vehicle body frame 5, and the rear end portions thereof being integrally secured to each other.

The head pipe 6 is formed into a cylindrical shape inclined so that the upper portion thereof is located on the rear side. The main frames 7 extend rearwardly so as to lie along an inclined plane S extending downwardly toward the rear and being substantially orthogonal to an axial line of the head pipe 6. An upper end of the head pipe 6 and upper surfaces of the main frames 7 are substantially positioned on the inclined plane S.

In a top view (in the direction indicated by an arrow in FIG. 3) which is orthogonal to the inclined plane S, the respective main frames 7 extend rearwardly and obliquely widthwise outwardly of the vehicle body from the head pipe 6 so as to be separated from each other with the center portions in the longitudinal direction being gently curved rearwardly and widthwise inwardly of the vehicle body, and then connected smoothly to the left and right pivot plates 8 arranged substantially in parallel with each other. The widthwise centerline of the vehicle shown in FIG. 4 (center line in the lateral direction) is represented by reference sign C. Curved lines extending so as to curve along the respective main frames 7 on the inclined plane S (in other words, the curved line along the extending directions of the respective main frames 7) are represented by reference sign K.

Assuming that a direction orthogonal to the inclined plane S is a longitudinal direction (substantially corresponding to the vertical direction) of the main frame 7 and a direction parallel with the inclined plane S and orthogonal to the curved line K is a lateral direction (corresponding to the inward-outward direction of the vehicle body) of the main frame 7, each main frame 7 has a rectangular shape with a vertical length that is larger than the lateral length thereof in cross section, and has a hollow structure with the outer peripheral portion having a predetermined thickness.

Assuming that a portion extending linearly in a side view from the head pipe 6 to the pivot plate 8 of each main frame 7 is a frame body 51, the frame body 51 is formed to have a longitudinal length which is substantially the same as the length of the head pipe 6 on the front half portion thereof, and a longitudinal length shorter on the rear half portion thereof. A tapered engine hanger 52 extends downwardly from the front half portion of the frame body 51, and a front suspending portion 53 at a distal end of the engine hanger 52 is connected to the front side of a proximal portion of the cylinder portion 17 of the engine 15 and supports the same.

Extending between a rear portion of the engine hanger 52 and a lower side of the rear half portion of the main frame 7 is a reinforcing member 54 inclined upwardly toward the rear. A center opening 55 penetrates widthwise of the vehicle body and is formed at a longitudinally midsection of the main frame 7 so as to be surrounded by the reinforcing member 54, the engine hanger 52 and the frame body 51.

On the front portion of the main frame 7 (frame body 51), a front opening 56 penetrates widthwise of the vehicle body and is formed at the vertical midsection thereof so as to be branched toward the front.

The respective openings 55, 56 are formed by cutting inner and outer walls of the hollow main frame 7, and include inner peripheral walls extending between the inner and outer walls. The inner peripheral walls also serve as cross members that connect the inner and outer walls. With the formation of the respective openings 55, 56 as described above on the main frame 7, an optimal balance of rigidity of the entire vehicle body frame 5 is achieved.

The front opening 56 is formed into a triangular shape in a side view which is small in the longitudinal direction and is tapered toward the rear. A rib 57 that traverses along a plane substantially orthogonal to the lateral direction is provided at the midsection in the fore-and-aft direction. Thus, the front opening 56 is partitioned by the rib 57 into a head-side opening 56a and a frame-side opening 56b.

A duct cover 58 extending over the head pipe 6 and the front portion of the both main frames 7 is integrally provided on the outside of the front end portion of the vehicle body frame 5. The duct cover 58 is formed with an air-inlet port 59 that opens toward the front immediately in front of the head pipe 6, and brings the air-inlet port 59 and the head-side opening 56a into communication. A rear end portion (intake-air exit) of an in-cowl duct 82 is connected to the air-inlet port 59 of the duct cover 58.

A gusset 61 extending from the head pipe 6 and the front portion of both main frames 7 is provided integrally on the inner side of the front end portion of the vehicle body frame 5. The gusset 61 includes a curved wall portion 62 curving so as to project toward the front in a plan view and a lower wall portion 63 extending from a lower edge of the curved wall portion 62 toward the front. The curved wall portion 62 extends obliquely downwardly from the rear end portion of an upper portion of the head pipe 6 and an upper edge of the front portion of the main frame 7 so as to be gradually away from the head pipe 6, and is connected to a rear edge of the flat lower wall portion 63 that is overlapped with a lower edge of the main frame 7 in a side view. Accordingly, the gusset 61 widens a space between the upper sides of the front portions of the both main frames 7 on the rear side of the head pipe 6 while reinforcing the front end portion of the vehicle body frame 5, thereby allowing easy arrangement of the steering damper 100 (see FIG. 2).

An interior of the gusset 61 is divided by a pair of partitioning walls 64 extending rearwardly from both side edges of the head pipe 6. Consequently, an in-frame duct 65 starting from the air-inlet port 59 at a front end of the duct cover 58, being branched to both sides of the head pipe 6 and extending rearwardly is formed on the front end portion of the vehicle body frame 5. The in-frame duct 65 opens left and right inlet-air exits 66 on the curved wall portion 62 of the gusset 61, and a front end portion (air-inlet port) of a box-side duct 67 extending from a front wall portion of the air cleaner box 19 is connected to the respective inlet-air exits 66 (see FIG. 2).

The in-cowl duct 82, the in-frame duct 65 and the box-side duct 67 define the air-inlet duct 80 and form the air-inlet route extending substantially linearly from the front end of the front cowl 46 to the air cleaner box 19 through the front end portion of the vehicle body frame 5 (see FIG. 2).

The respective pivot plates 8 extend downwardly so as to be bent at the rear end of the respective main frames 7. Provided between the upper portions and between the lower portions of the respective pivot plates 8 are an upper cross member 71 and a lower cross member 72 extending along the width of the vehicle body. Provided at a center of the lower cross member 72 with respect to the width of the vehicle body is a joint member 73 with respect to the link mechanism 14. The upper cross member 71 serves to adjust the rigidity of the vehicle body frame 5. The upper cross member 71 is smaller and thinner relative to the lower cross member 72.

Each pivot plate 8 is provided with a shaft support portion 74 for supporting a pivot shaft of the swing arm 11 substantially at a vertical center thereof. Each pivot plate 8 is also provided at upper and lower portions thereof with an upper rear suspending portion 75 and a lower rear suspending portion 76 for being connected to an upper rear side and a lower rear side of the crankcase 16 of the engine 15 for supporting the crankcase 16. A rear half portion of the vehicle body frame 5 is reinforced as needed by the engine 15 that is connected to the suspending portions 75, 76 and the front suspending portion 53 at respective parts thereof The vehicle body frame 5 is divided into four aluminum cast parts. More specifically, a head pipe portion 6A formed by integrating the head pipe 6 and the front portions of the respective main frames 7, left and right main frame portions 7A mainly composed of the midsections of the respective main frames 7, and a pivot plate portion 8A formed by integrating the rear portions of the respective main frames 7 and the respective pivot plates 8 via the respective cross members 71, 72, joined integrally by welding.

The parting plane between the head pipe portion 6A and the main frame portion 7A (the parting plane between the front portion and the midsection of the main frame 7, hereinafter referred to as "front parting plane Z") is a plane substantially orthogonal to the lateral direction, and is a plane intersecting obliquely with the direction of extension of the main frame 7 (the curved line K). The parting plane between the main frame portion 7A and the pivot plate portion 8A (a parting plane between the midsection and the rear section of the main frame 7, represented by Y in the drawing) is a plane substantially orthogonal to the direction of the extension of the main frame 7.

The front opening 56 of the main frame 7 is formed so as to extend across the head pipe portion 6A and the main frame portion 7A, and the rib 57 extending from top to bottom of the front opening 56 is formed so as to extend across the front opening 56 on the front parting plane Z. Accordingly, the rib 57 is divided into a head-side rib 57a as part of the head pipe portion 6A and a frame side rib 57b as part of the main frame portion 7A.

The head-side rib 57a is formed with a socket portion that opens toward the front parting plane Z by a bottom wall as the rib body displaced from the front parting plane Z toward the head pipe 6 except for the outer peripheral wall along the outer periphery of the main frame 7, which corresponds to the outer edge thereof. On the other hand, the frame-side rib 57b is formed with an adapter portion that corresponds to the socket portion so that the head pipe portion 6A and the main frame portion 7A are welded along the entire circumference of the main frame 7 in a state in which the adapter portion is inserted into the socket portion.

In other words, the head pipe portion 6A and the main frame portion 7A are joined not only along the outer periphery of the main frame portion 7A (main frame 7), but also along the edge facing to the outer periphery of the main frame portion 7A of the rib 57.

A front end of the pivot plate portion 8A (at the front end of the rear portion of the main frame 7) is formed with an adaptor portion formed by reducing the contour of the main frame 7, and the main frame portion 7A and the pivot plate portion 8A are welded around the entire circumference of the main frame 7 in a state in which the adaptor portion is inserted into the rear end portion of the main frame portion 7A (within the rear end of the front portion of the main frame 7).

As described above, the vehicle body frame structure according to the above-described embodiment is applied to the vehicle body frame 5 including the head pipe portion 6A and the main frame portion 7A formed separately from each other and joined integrally to each other. The vehicle body frame 5 includes the front opening 56 that penetrates through the vehicle body frame 5 across the head pipe portion 6A and the main frame portion 7A and the rib 57 extending across the front opening 56 along the front parting plane Z of the vehicle body frame 5. The rib 57 is divided along the front parting plane Z and the edges of the divided rib portions 57, which oppose the outer periphery of the main frame portion 7A, and are integrally joined.

In this structure, the main frame portion 7A and the head pipe portion 6A are joined (welded) also along the edges of the rib portions 57 extending across the front opening 56, which oppose the outer periphery of the main frame portion 7A, whereby the joint portion (welded portion) of the vehicle body frame 5 is not divided by the front opening 56. Thus, it is no longer necessary to apply welding on the inner side of the front opening 56. Therefore, the joint strength of the vehicle body frame 5 can be enhanced while securing the welding length easily.

In the vehicle body frame structure described above, since the vehicle body frame 5 is the twin tube frame having a pair of left and right main frame portions 7A, the above-described arrangement is preferable in a point of enhancing rigidity of the frame.

In addition, in the vehicle body frame structure described above, since the head pipe portion 6A and the main frame portion 7A are aluminum cast parts, the vehicle body frame 5 which generally has a hollow structure can be divided into relatively small parts (the head pipe portion 6A and the main frame portion 7A). Thus, the hollow casting can easily be achieved, whereby the manufacturing cost can be reduced.

In addition, in the vehicle body frame structure described above, since the front opening 56 is used as part of the air-inlet route to the engine 15, in addition to a reduction of the weight and an optimization of the rigidity of the vehicle body frame 5, an additional function is provided to the front opening 56. Thus, a rationalization of the frame design is achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle body frame structure having a head pipe portion and a main frame portion, the head pipe portion and the main frame portion being formed separately and jointed integrally with each other, comprising:
an opening penetrating through the body frame across the head pipe portion and the main frame portion; and
a rib extending across the opening along a parting plane of the vehicle body frame;
wherein the rib is divided along the parting plane and edges of the divided rib portions opposing the outer periphery of the main frame portion are integrally joined.

2. The vehicle body frame structure according to claim 1, wherein the vehicle body frame is a twin tube frame having a pair of left and right main frame portions.

3. The vehicle body frame structure according to claim 1, wherein the head pipe portion and the main frame portion are formed of aluminum cast parts.

4. The vehicle body frame structure according to claim 2, wherein the head pipe portion and the main frame portion are formed of aluminum cast parts.

5. The vehicle body frame structure according to claim 1, wherein the opening is used as an engine air-inlet route.

6. The vehicle body frame structure according to claim 2, wherein the opening is used as an engine air-inlet route.

7. The vehicle body frame structure according to claim 3, wherein the opening is used as an engine air-inlet route.

8. The vehicle body frame structure according to claim 1, wherein the opening is substantially triangular in shape in a side view and is smaller in a longitudinal direction and is tapered towards a rear direction.

9. The vehicle body frame structure according to claim 8, wherein the rib traverses along a plane substantially orthogonal to a lateral direction and is provided at a midsection in a fore-and-aft direction.

10. The vehicle body frame structure according to claim 9, wherein the opening is partitioned by the rib into a head-side opening and a frame-side opening.

11. A vehicle body frame structure having a head pipe portion and a main frame portion, the head pipe portion and the main frame portion being formed separately and jointed integrally with each other, comprising:
a front opening penetrating through the body frame across the head pipe portion and the main frame portion;
a rib extending across the front opening for dividing the opening into a head-side opening and a frame-side opening; and
a parting plane being formed between the head pipe portion and the main frame portion with the rib being formed along the parting plane and the head pipe portion and the main frame portion and the rib formed along the parting plane are integrally joined together.

12. The vehicle body frame structure according to claim 11, wherein the vehicle body frame is a twin tube frame having a pair of left and right main frame portions.

13. The vehicle body frame structure according to claim 11, wherein the head pipe portion and the main frame portion are formed of aluminum cast parts.

14. The vehicle body frame structure according to claim 12, wherein the head pipe portion and the main frame portion are formed of aluminum cast parts.

15. The vehicle body frame structure according to claim 11, wherein the opening is used as an engine air-inlet route.

16. The vehicle body frame structure according to claim 12, wherein the opening is used as an engine air-inlet route.

17. The vehicle body frame structure according to claim 13, wherein the opening is used as an engine air-inlet route.

18. The vehicle body frame structure according to claim 11, wherein the opening is substantially triangular in shape in a side view and is smaller in a longitudinal direction and is tapered towards a rear direction.

19. The vehicle body frame structure according to claim 18, wherein the rib traverses along a plane substantially orthogonal to a lateral direction and is provided at a midsection in a fore-and-aft direction.

20. The vehicle body frame structure according to claim 19, wherein the head pipe portion and the main frame portion and the rib formed along the parting plane are welded together without applying welding on an inner side of the front opening.

* * * * *